(12) United States Patent
Akkermans

(10) Patent No.: US 7,120,094 B1
(45) Date of Patent: Oct. 10, 2006

(54) DEVICE FOR READING AND/OR WRITING INFORMATION FROM/ONTO AN OPTICAL INFORMATION CARRIER

(75) Inventor: Antonius H. M. Akkermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 340 days.

(21) Appl. No.: 09/704,595

(22) Filed: Nov. 2, 2000

(30) Foreign Application Priority Data

Nov. 4, 1999 (EP) ................................ 99203644

(51) Int. Cl.
*G11B 7/00* (2006.01)
*G11B 7/09* (2006.01)

(52) U.S. Cl. .............................. 369/44.28; 369/44.34; 369/53.28

(58) Field of Classification Search ............. 369/53.22, 369/53.31, 44.34, 53.28, 44.27, 44.29, 44.28
See application file for complete search history.

(56) References Cited

U.S. PATENT DOCUMENTS

| | | | | |
|---|---|---|---|---|
| 4,561,082 A | * | 12/1985 | Gerard et al. ............ | 369/44.34 |
| 4,813,031 A | * | 3/1989 | Bierhoff ................... | 369/44.34 |
| 5,228,019 A | * | 7/1993 | Yanagi ..................... | 369/44.28 |
| 5,245,598 A | | 9/1993 | Burroughs ............... | 369/44.28 |
| 5,636,197 A | * | 6/1997 | Tateishi ................... | 369/44.34 |
| 5,856,959 A | * | 1/1999 | Yanagisawa ............. | 369/44.23 |

FOREIGN PATENT DOCUMENTS

JP 09320070 A * 12/1997

* cited by examiner

*Primary Examiner*—Wayne Young
*Assistant Examiner*—Jorge L. Ortiz-Criado
(74) *Attorney, Agent, or Firm*—Michael E. Belk

(57) ABSTRACT

A device for reading and/or writing information from an optical carrier, the device comprising an imager for imaging a radiation beam into scanning spot to scan the carrier, and a detector for generating a read signal indicative of the intensity of the radiation reflected from the carrier. The device has an information transfer mode, wherein the scanning spot is moved in a first direction. The device has a displacement mode, wherein the scanning spot is moved in a second direction transverse to the first direction. The device includes a controller for controlling the imager in response to a measurement signal indicative of the degree of focusing of the radiation beam. The controller samples and holds the measurement signal in response to a sample signal causing the measurement signal to be sampled when the intensity is comparatively high thus reducing radial-to-vertical crosstalk.

20 Claims, 4 Drawing Sheets

DEVICE FOR READING AND/OR WRITING INFORMATION FROM/ONTO AN OPTICAL INFORMATION CARRIER

BACKGROUND OF THE INVENTION

1. Technical Field

The invention relates to a device for reading and/or writing information from/onto an optical information carrier, comprising read means including imaging means for imaging a radiation beam so as to form a scanning spot by means of which the information carrier is scanned, and including detection means for generating a read signal which is indicative of the intensity of the radiation reflected from the information carrier at the location of the scanning spot, which device has an information transfer mode, in which the scanning spot is moved in a first direction with respect to the information carrier, which device has a displacement mode, in which the scanning spot is moved in a second direction transverse to the first direction, control means for controlling the imaging means in response to a measurement signal which is indicative of the degree of focusing of the radiation beam at the location of the scanning spot, which control means include sample and hold means for sampling and holding the measurement signal in response to a sample signal.

2. Related Art

From U.S. Pat. No. 5,245,598 a device is known which is suitable for scanning a magneto-optical disc-shaped information carrier. In the information carrier described therein the information is recorded in mutually concentric tracks which are separated by grooves. The information is recorded by forming magnetic patterns in the information carrier. The information is read by focusing a radiation beam is focused onto the information carrier and by measuring the polarization of the beam reflected from the location of the scanning spot thus formed. The scanning spot is then moved in a first direction, i.e. along the tracks. With the aid of detectors a focus error signal is derived from the reflected radiation. A sample and hold circuit generates a sampled focus error signal from the focus error signal. In response thereto a control system generates a control signal for focusing the beam. In a displacement mode of the device the sample and hold circuit is controlled by a tracking error signal, the focus error signal being sampled if the scanning spot is incident on a track and is maintained constant if the scanning spot is incident on a groove. According to said document the focus servo mechanism is preferably in a continuous sample mode during scanning of the information carrier. The measures taken in the known device suppress radial to vertical crosstalk (RV crosstalk) during a radial movement of the scanning spot on a magneto-optical information carrier as described above. However, the known measures do not suppress RV crosstalk which occurs in optical information carriers which store the information in the form of differences in level.

SUMMARY OF THE INVENTION

It is an object of the invention to provide in a device of the type defined in the opening paragraph a measure which enables RV cross-talk to be suppressed in information carriers of the last-mentioned type. To this end, according to the invention, the device of the type defined in the opening paragraph is characterized in that the sample signal causes the measurement signal to be sampled when said intensity is comparatively high. Said intensity is an indication of the location of the scanning spot with respect to the patterns provided in the information carrier. In an information carrier in which the information is stored in the form of differences in level sampling of the measurement signal at instants at which said intensity is comparatively high ensures that sampling is always effect at locations having mutually the same level. This results in a substantial reduction of the radial to vertical crosstalk.

BRIEF DESCRIPTION OF THE DRAWINGS

These and other aspects of the device in accordance with the invention are described in greater detail with reference to the drawings. In the drawings

DETAILED DESCRIPTION OF THE INVENTION

Figure 1:
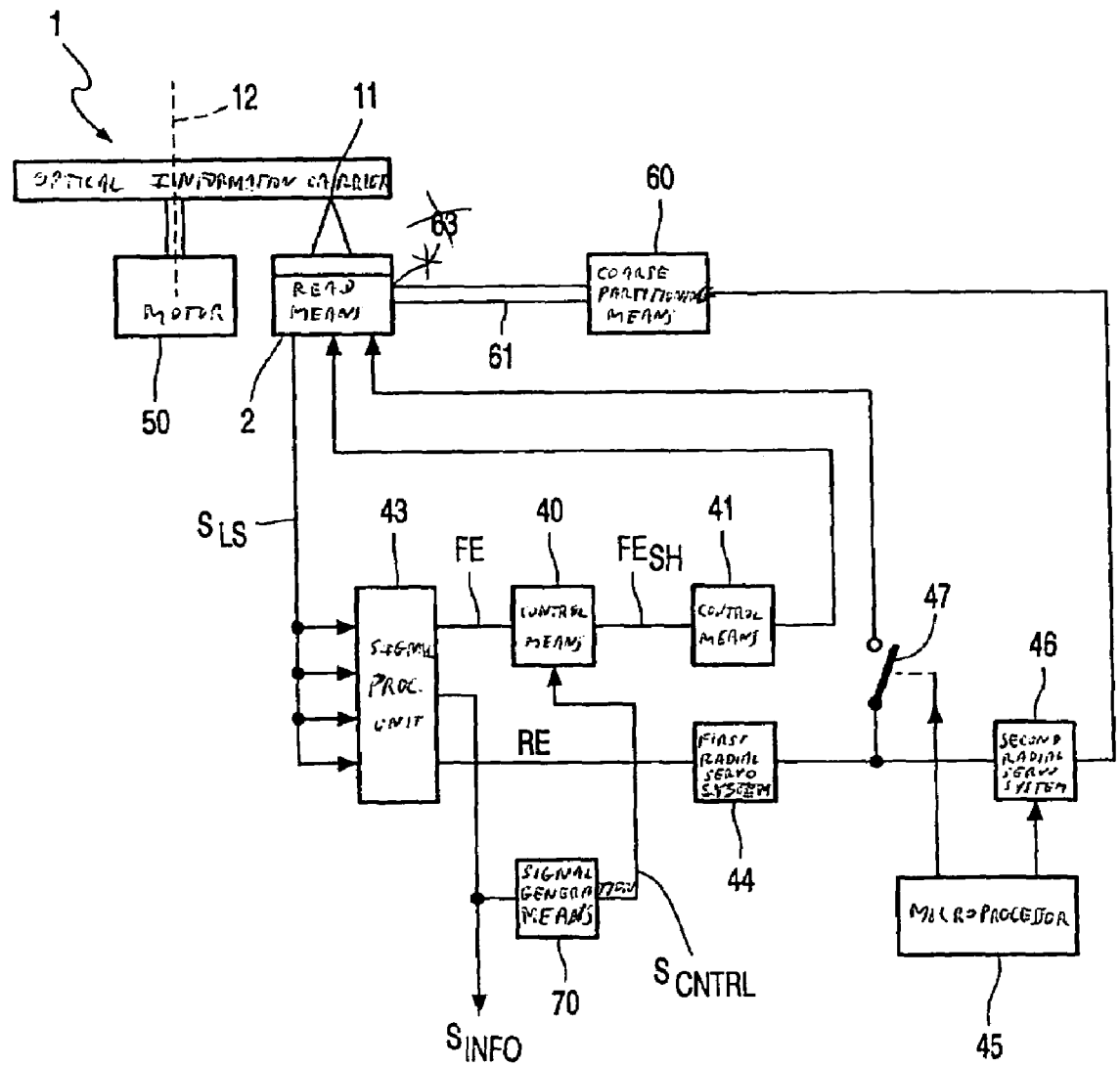
FIG. 1 shows diagrammatically a device in accordance with the invention.
Figure 2:
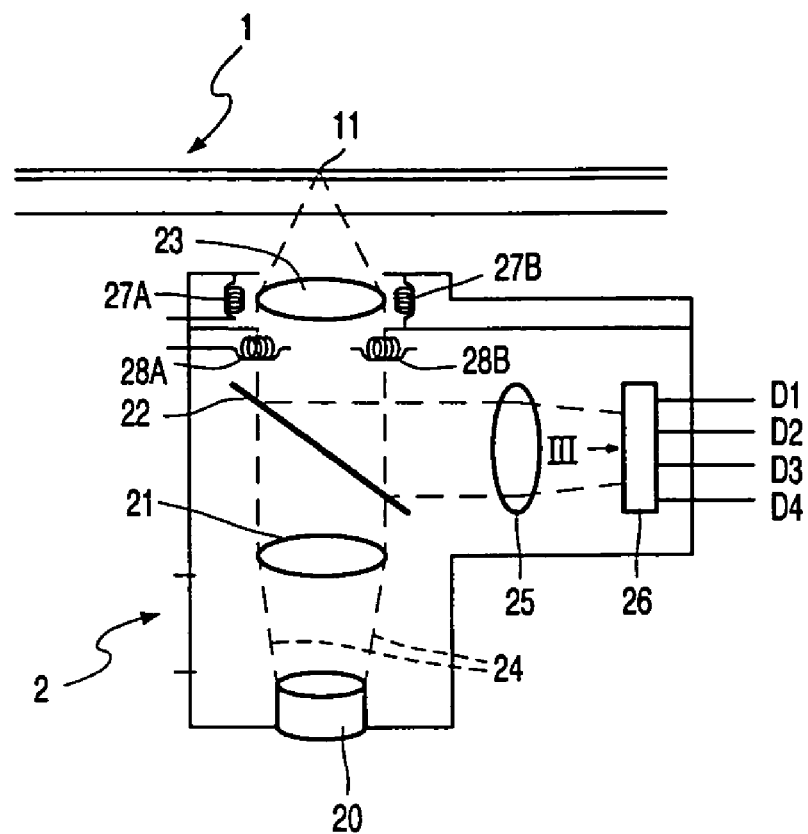
FIG. 2 shows a part of the device shown in FIG. 1.
Figure 3:
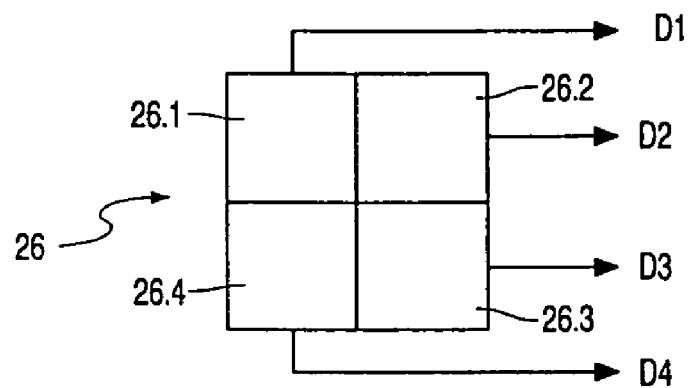
FIG. 3 shows a detail at the location III in FIG. 2.

FIG. 1 shows a device for reading and/or writing information from/onto an optical information carrier 1. In the present embodiment the information carrier is disc-shaped and the information carrier has mutually concentric tracks around a center which substantially coincides with an axis 12. Together the tracks form a spiral but alternatively they may be separate from one another and be closed in themselves. The device shown in FIG. 1 includes read means 2. FIG. 2 shows the read means 2 in greater detail. The read means include imaging means, namely a lens 21, a beam splitter 22, and a focusing element 23 for focusing a radiation beam 24 to a scanning spot 11 by means of which the information carrier 1 is scanned. The radiation beam is generated by a radiation source 20, such as a solid-state laser. The read means further include detection means 25, 26 for generating a read signal $S_{LS}$ which is indicative of the intensity of the radiation reflected from the information carrier 1 at the location of the scanning spot 11. In the present case, the detection means are formed by an astigmatic element 25 and a four-quadrant detector 26, which is shown in more detail in FIG. 3. The detector 26 supplies a read signal $S_{LS}$ composed of the signals D1, D2, D3, D4 which are measures of the intensity of the radiation incident on each of the four quadrants 26.1, 26.2, 26.3, 26.4 of the detector 26.

The device shown has an information transfer mode, in which the scanning spot 11 is moved along the tracks. The movement of the scanning spot 11 then has a tangential first direction with respect to the axis 12 of the information carrier 1. For this purpose, the information carrier 1 is rotated about the axis 12 by means of a motor 50.

The device also has a displacement mode, in which the scanning spot 11 is moved in a radial second direction transverse to the first direction. For this purpose, the device has coarse positioning means 60, in the form of a slide motor for moving a slide 61 which carries the read means.

The device has control means 40, 41 for controlling the imaging means 21, 22, 23 in response to a measurement signal FE. The measurement signal FE is indicative of the degree of focusing of the radiation beam 24 at the location of the scanning spot 11. The control means include sample and hold means 40 for sampling and holding the measurement signal FE in response to a sample signal $S_{CNTRL}$. The sample and hold means 40 generate an output signal $FE_{SH}$ which serves as an input signal for a PID controller 41, which controls an actuator 27A, 27B for focusing the radiation beam 24.

The measurement signal FE is derived from the four signals D1–D4 by means of a signal processing unit 43, in such a manner that $$FE=(D1+D3)-(D2+D4)$$

Furthermore, the signal processing unit 43 is responsive to the signals D1–D4 to generate a radial error signal RE, which complies with:

$$RE=(D1+D2)-(D3+D4)$$

The radial error signal RE serves as an input signal for a first radial servo system 44 for tracking in the information transfer mode. In said mode the switch 47 is closed, as a result of which the first radial servo system 44 supplies a radial control signal to the radial actuators $28_A$, $28_B$. The radial control signal also serves as an input signal for a second radial servo system 46, which supplies the control signal for the slide motor 60. The switch 47 and the second radial servo system 46 are controlled by a microprocessor 45.

The signal processing unit further generates an information signal $S_{INFO}$ which is representative of information patterns recorded on the information carrier. The information signal $S_{INFO}$ complies with:

$$S_{INFO}=D1+D2+D3+D4.$$

Figure 4:
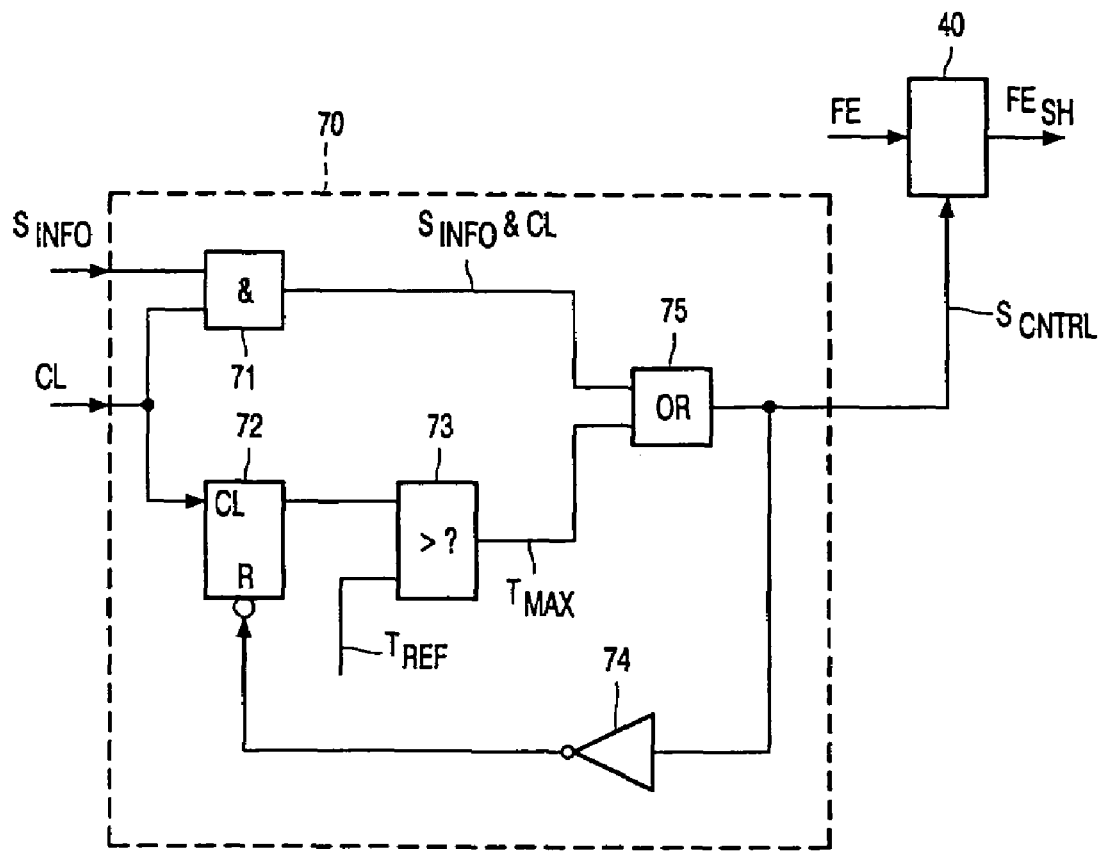
FIG. 4 shows a circuit of the device shown in FIG. 1.

The sample signal $S_{CNTRL}$ causes the measurement signal FE to be sampled when the intensity of the reflected radiation is comparatively high and the measurement signal to be held when the intensity of the reflected radiation is low. The sample signal $S_{CNTRL}$ is derived from the information signal $S_{INFO}$ with the aid of signal generation means 70. The signal generation means 70 are shown in greater detail in FIG. 4. Said means include means 72 for measuring the time during which the measurement signal FE is held and means 73, 75 for causing the measurement signal FE to be sampled when the time exceeds a predetermined value.

The present device operates as follows. During the read-out of information in the information transfer mode the radiation source 20 generates a radiation beam 24. The radiation beam 24 is imaged via the lens 21, the beam splitter 22 and the convergent lens 23 so as to form a light spot by means of which the information carrier 1 is scanned. Radiation reflected from the information carrier 1 is imaged onto the detector 26 via the convergent lens 23, the beam splitter 22 and the astigmatic lens 25. The light spot is moved in the first direction R1 with respect to the information carrier 1 by rotating the information carrier. By means of the signal processing unit 43 the information signal $S_{INFO}$, which represents the information read from the information carrier 1, is derived from the read signal $S_{LS}$, which is composed of the signals D1, D2, D3, D4.

Figure 5:
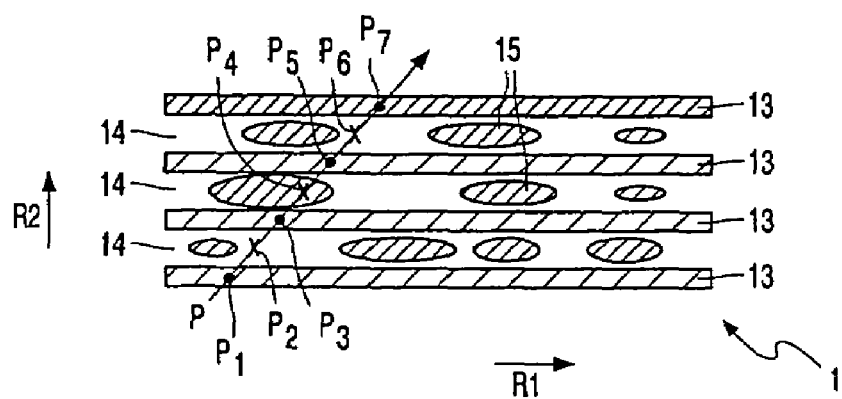
FIG. 5 shows possible displacements of the scanning spot with respect to the information carrier.

FIG. 5 illustrates the movement of the scanning spot 11 along a path p on the information carrier 1. The information carrier 1 has tracks 14 which are separated from one another by grooves 13. Information is recorded in the tracks 14 in the form of differences in level, namely as pits 15.

In the displacement mode the read means and, consequently, the scanning spot 11 are moved in a radial direction R2 with respect to the axis 12. Moreover, just as in the information transfer mode, the information carrier 1 is rotated, which causes the scanning spot to be moved also in the first direction R1. As a result of this, the scanning spot 11 moves along a path P with respect to the information carrier 1.

Figure 6A:
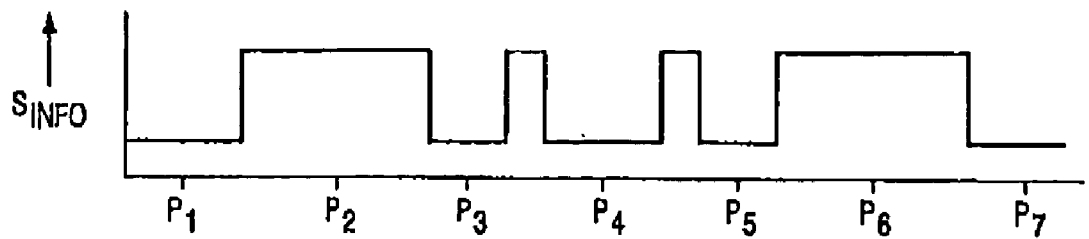
FIG. 6 shows some signals appearing in the circuit shown in FIG. 4.
Figure 6B:
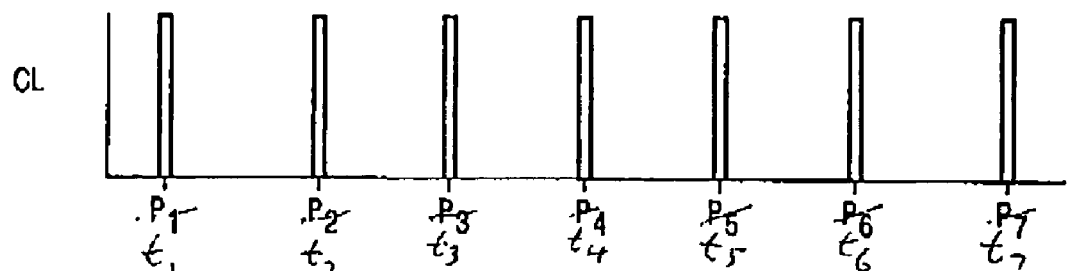
Figure 6C:
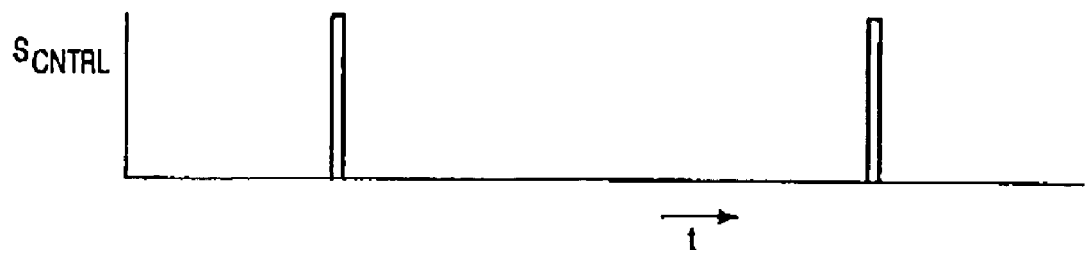

FIG. 6A shows the signal $S_{INFO}$, which is indicative of the intensity of the radiation reflected from the information carrier. FIG. 6B shows the clock signal CL. The clock signal has pulses at the instants t1, t2, . . . , t7. At these instants the scanning spot is successively situated at a position p1 to p7. The AND gate 71 generates an auxiliary signal $S_{INFO \& CL}$. The clock signal CL is also supplied to a clock input of a counter 72. The count of the counter is incremented by 1 upon each edge of the clock signal and is compared with a reference value $T_{REF}$ in a comparator 73. The OR gate 75 generates the sample signal $S_{CNTRL}$ (see FIG. 6C). As long as the count is smaller than the reference value $T_{REF}$ the sample signal $S_{CNTRL}$ is identical to the auxiliary signal $S_{INFO \& CL}$. The measurement signal FE is sampled as soon as the sample signal $S_{CNTRL}$ has a logic value 1. In the present case the measurement signal FE is sampled at the instants t2, t6, at which the scanning spot is situated between the grooves 13 and between the pits 15. This precludes the occurrence of radial to vertical crosstalk.

In the case that it takes too long before the measurement signal FE is sampled instabilities may occur in the control of the actuators $27_A$, $27_B$ for focusing the beam 24. In the present embodiment this is avoided. As long as the sample signal $S_{CNTRL}$ has a logic value "0" the count of the counter 72 is incremented upon each clock pulse of the clock signal CL. As soon as the count exceeds the reference value $T_{REF}$ a signal $T_{MAX}$ having a logic value "1" is generated. The sample signal $S_{CNTRL}$ then also assumes a logic value "1", as a result of which the measurement signal FE is sampled frequently enough. As soon as the sample signal $S_{CNTRL}$ has a logic value "1" the inverter 74 generates a reset value having a logic value "0", which resets the counter 72.

The invention is of particular importance for information carriers on which the information is stored in the form of differences in level. An attractive embodiment of the device in accordance with the invention is characterized by means for generating a signal which, when it has a first logic value, indicates that information has been/is recorded on the information carrier in the form of differences in level of a surface of the information carrier.

What is claimed is:

1. A device for reading and/or writing information from/ onto an optical information carrier; said information stored in the form of differences in intensity level, said device comprising:

read means including imaging means for imaging a radiation beam so as to form a scanning spot by means of which the information carrier is scanned, including detection means for generating a read signal which is indicative of the intensity of the radiation reflected from the information carrier at the location of the scanning spot;

which device has an information transfer mode, in which the scanning spot is moved in a first direction with respect to the information carrier;

which device has a displacement mode, in which the scanning spot is moved in a second direction transverse to the first direction;

control means for controlling the imaging means in response to a measurement signal which is indicative of the degree of focusing of the radiation beam at the location of the scanning spot, which control means include sample and hold means for sampling and holding the measurement signal in response to a sample signal, wherein the sample signal ($S_{CNTRL}$) causes the measurement signal to be sampled at locations having mutually the same intensity level, and to cause sampling of the measurement signal if the measurement signal has not been measured within a predetermined period of time.

2. A device as claimed in claim 1, wherein the sample signal is responsive to a time during which the measurement signal is held causing the measurement signal to be sampled when the time exceeds the predetermined period of time.

3. A device for reading and recording information on an optical information carrier, said information carrier having information stored therewithin as patterns formed by differences in intensity levels, said device comprising:

a read system adapted to read data from said optical information carrier, said read system further comprising a radiation beam source, a radiation beam, a device for focusing said radiation beam, a scanning spot formed with said focused radiation beam and proximate said optical information carrier, said scanning spot having an intensity, a motion control device for controlling movement of said scanning spot relative to said optical information carrier, and for generating a read signal which is indicative of the intensity of the radiation reflected from the information carrier at the location of the scanning spot, said read system further adapted to derive, from said optical information carrier via said scanning spot, a measurement signal, a radial error signal, and an information signal; and a signal generation system operatively coupled to said read system, said signal generation system adapted to produce a sample signal to control sampling of said measurement signal, said sample signal proportional to the intensity of said scanning spot, and wherein said sample signal causes the measurement signal to be sampled at locations having mutually the same intensity level and wherein said sample signal causes the measurement signal to be sampled if the measurement signal has not been sampled within a predetermined time interval.

4. The device of claim 3, wherein said intensity of said scanning spot is an indicator of a location of the scanning spot with respect to the patterns provided in the information carrier.

5. The device of claim 3, wherein said sample signal causes the measurement signal to be sampled at instants when said intensity is comparatively high and a periodic clock signal is received by said signal generation system.

6. The device of claim 3, wherein said signal separation system comprises:

a first input node for receiving said information signal;
a second input node for receiving a clock signal;
an output node for providing an output signal, wherein said output signal is said sample signal;
an AND gate having a first input connected to said first input node, and a second input connected to said second input node, said AND gate having an output for an AND gate output signal;

a counter having a clock input connected to said second input node, said counter having an output for a counter output signal, and an inverted rest input;

a comparator having a reference input and a counter input, said counter input adapted to receive the counter output signal, said comparator also having an output for a comparator output signal;

an OR gate having a first input for receiving said AND gate output signal, and a second input for receiving said comparator output signal, said OR gate having an output for an OR gate output signal, said OR gate output signal connected to said sample signal; and an inverter having a first input connected to said OR gate output for receiving said OR gate output signal, said inverter having an output for an inverter output signal, said inverter output connected to said inverted reset input of said counter.

7. The device of claim 3, wherein said read system is adapted to operate in two operational modes:

an information transfer mode wherein said motion control device provides motion of said scanning spot in a tangential first direction with respect to an axis about which said information carrier is rotated; and a displacement mode wherein said motion control device provides motion of said scanning spot in a radial second direction, wherein said radial transverse direction is transverse to said first direction.

8. The device of claim 3, wherein said read system further comprises a system for generating a logic signal which indicates that information is recorded on the information carrier in the form of differences in level of a surface of the information carrier.

9. A method of reading information stored on an optical information carrier, said method comprising:

providing an optical information carrier, said optical information carrier having a multilevel structure, and said optical information carrier bearing data recorded as patterns formed in the information carrier by differences in intensity levels;

providing a read system adapted to read data from said optical information carrier, said read system further comprising a radiation beam source, a radiation beam, a device for focusing said radiation beam, a scanning spot formed with said focused radiation beam and proximate said optical information carrier, said scanning spot having an intensity, a motion control device for controlling movement of said scanning spot relative to said optical information carrier, and for generating a read signal which is indicative of the intensity of the radiation reflected from the information carrier at the location of the scanning spot, said read system further adapted to derive, from said optical information carrier via said scanning spot, a measurement signal, a radial error signal, and an information signal; and providing a signal generation system operatively coupled to said read system, said signal generation system adapted to produce a sample signal to control sampling of said measurement signal, said sample signal proportional to the intensity of said scanning spot, and wherein said sample signal causes the measurement signal to be sampled at locations having mutually the same intensity level and if the measurement signal has not been sampled to cause sampling of the measurement single within a predetermined time period.

10. The method of claim 9, wherein said intensity of said scanning spot is used as an indication of a location of the scanning spot with respect to the patterns provided in the information carrier.

11. The method of claim 9, wherein said sample signal causes the measurement signal to be sampled at instants when said intensity is comparatively high and a periodic clock signal is received by said signal generation system.

12. The method of claim 9, wherein said signal generation system comprises:
- a first input node for receiving said information signal;
- a second input node for receiving a clock signal;
- an output node for providing an output signal, wherein said output signal is said sample signal;
- an AND gate having a first input connected to said first input node, and a second input connected to said second input node, said AND gate having an output for an AND gate output signal;
- a counter having a clock input connected to said second input node, said counter having an output for a counter output signal, and an inverted reset input;
- a comparator having a reference input and a counter input, said counter input adapted to receive the counter output signal, said comparator also having an output for a comparator output signal;
- an OR gate having a first input for receiving said AND gate output signal, and a second input for receiving said comparator output signal, said OR gate having an output for an OR gate output signal, said OR gate output signal connected to said sample signal; and
- an inverter having a first input connected to said OR gate output for receiving said OR gate output signal, said inverter having an output for an inverter output signal, said inverter output connected to said inverted reset input of said counter.

13. The method of claim 9, wherein said read system is adapted to operate in two operational modes:
- an information transfer mode wherein said motion control device provides motion of said scanning spot in a tangential first direction with respect to an axis about which said information carrier is rotated; and
- a displacement mode wherein said motion control device provides motion of said scanning spot in a radial second direction, wherein said radial transverse direction is transverse to said first direction.

14. The method of claim 9, wherein said sampling of the measurement signal when said intensity is comparatively high results in a reduction of radial-to-vertical crosstalk.

15. An apparatus for employing an optical information carrier, said apparatus comprising:
- device for reading and recording information on said optical information carrier, said information carrier having information stored therewithin as patterns formed by differences in levels;
- a read system adapted to read data from said optical information carrier, said read system further comprising a radiation beam source, a radiation beam, a device for focusing said radiation beam, a scanning spot formed with said focused radiation beam and proximate said optical information carrier, said scanning spot having an intensity, a motion control device for controlling movement of said scanning spot relative to said optical information carrier, and a device for deriving, from said optical information carrier via said scanning spot, a measurement signal, a radial error signal, and an information signal; and
- a signal generation system operatively coupled to said read system, said signal generation system adapted to produce a sample signal to control sampling of said measurement signal, said sample signal proportional to the intensity of said scanning spot, and wherein said sample signal causes the measurement signal to be sampled when said intensity is comparatively high and wherein if the measurement signal is not sampled within a predetermined time period then said sample signal causes the measurement signal to be sampled.

16. The apparatus of claim 15, wherein the predetermined time period determined by a measuring device that is reset after said sampling of the measurement signal.

17. The apparatus of claim 15, wherein the measurement signal is held if said intensity is not comparatively high.

18. The apparatus of claim 15, wherein the sample signal causes the measurement signal to be sampled creating a sampled measurement signal, and the sampled measurement signal is employed to control focusing of said radiation beam.

19. The apparatus of claim 15, wherein said read system is adapted to operate in at least two operational modes including:
- an information transfer mode wherein said motion control device provides motion of said scanning spot in a tangential first direction with respect to an axis about which said information carrier is rotated; and
- a displacement mode wherein said motion control device provides motion of said scanning spot in a radial second direction, wherein said radial transverse direction is transverse to said first direction.

20. The apparatus of claim 15, wherein the measurement signal sampled when said intensity is comparatively high is indicative of the location of the scanning spot patterns on the optical information carrier.

* * * * *